Figure 3:
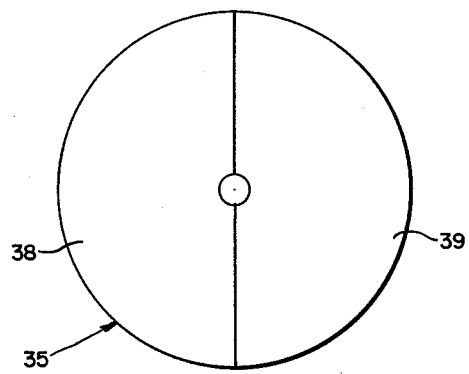

May 12, 1964
F. C. ROCK
3,133,201
COLOR ANALYZING ARRANGEMENT
Filed Aug. 30, 1960
5 Sheets-Sheet 1
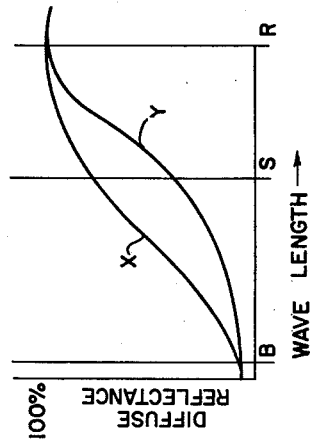
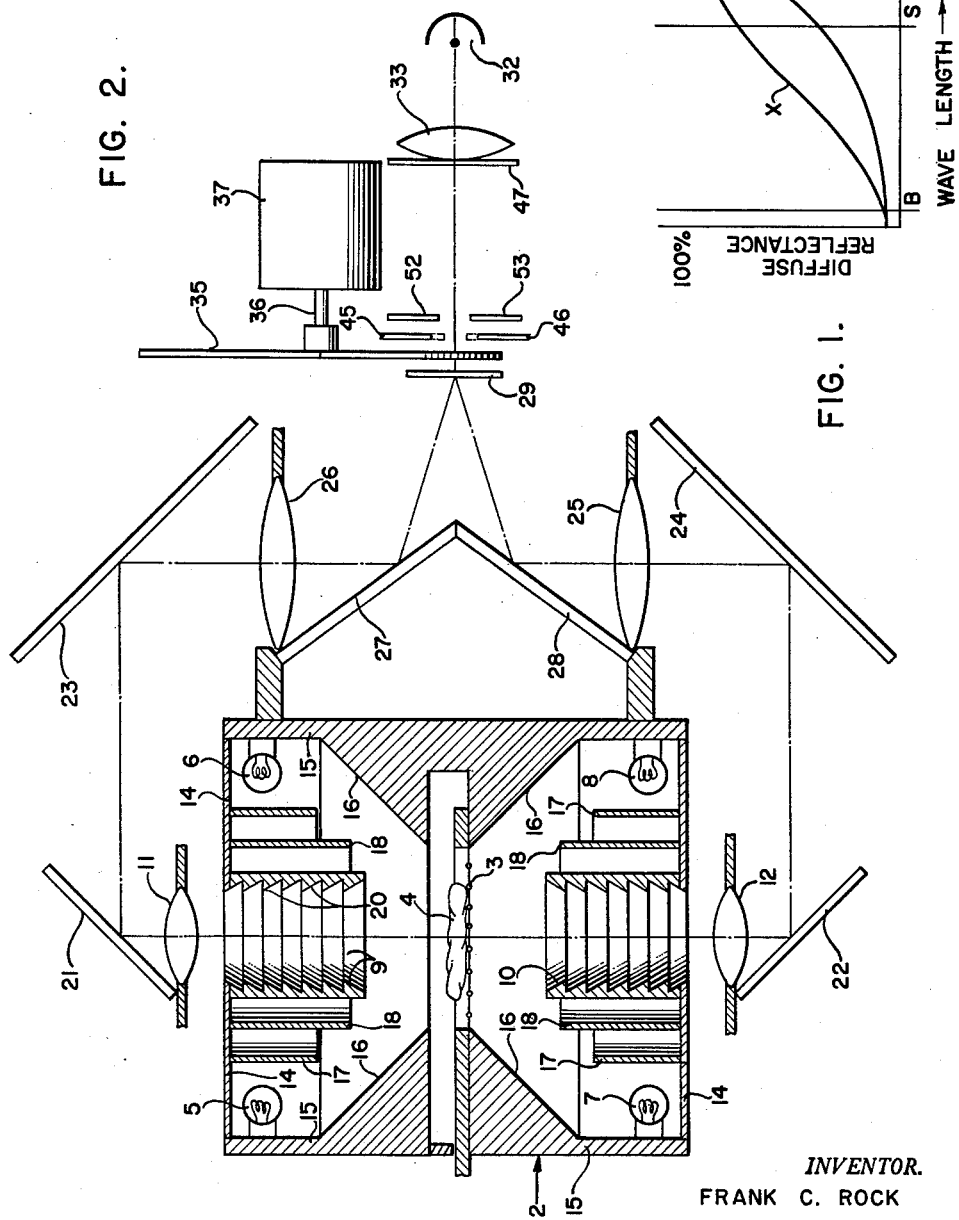
*INVENTOR.*
FRANK C. ROCK
BY
ATTORNEY

INVENTOR.
FRANK C. ROCK
ATTORNEY

May 12, 1964   F. C. ROCK   3,133,201
COLOR ANALYZING ARRANGEMENT
Filed Aug. 30, 1960   5 Sheets-Sheet 3

INVENTOR.
FRANK C. ROCK
BY
ATTORNEY

May 12, 1964     F. C. ROCK     3,133,201
COLOR ANALYZING ARRANGEMENT
Filed Aug. 30, 1960     5 Sheets-Sheet 4

INVENTOR.
FRANK C. ROCK
BY
ATTORNEY

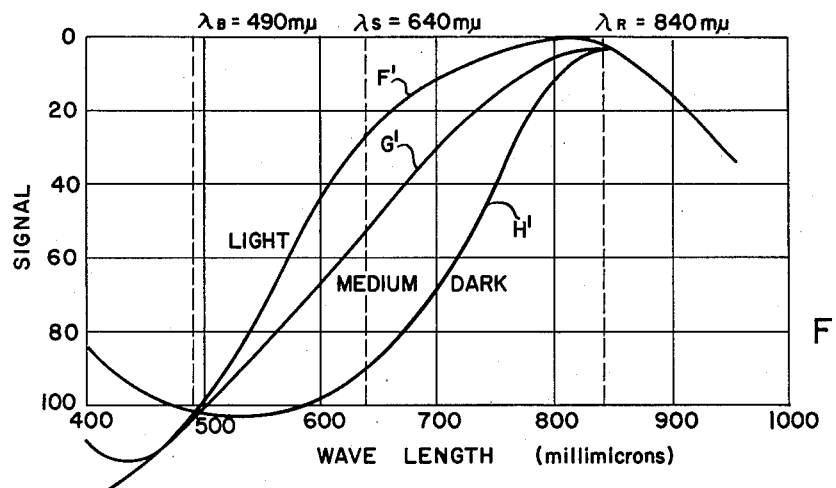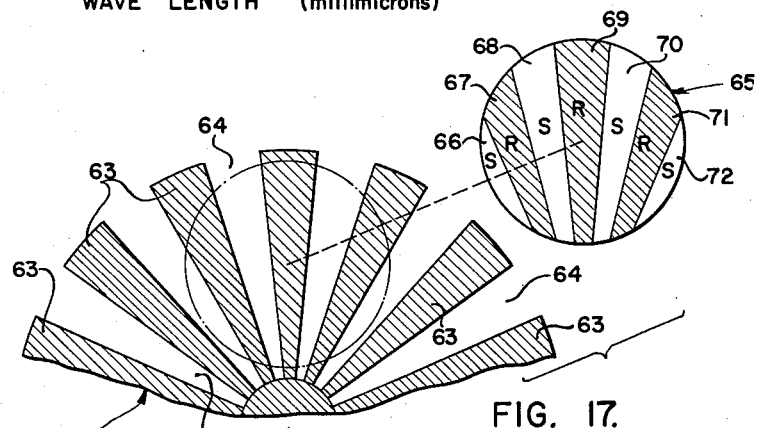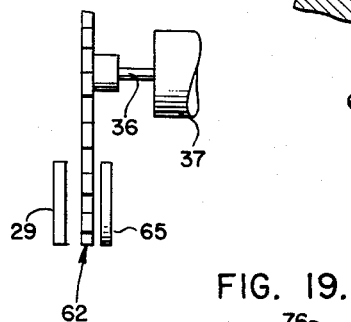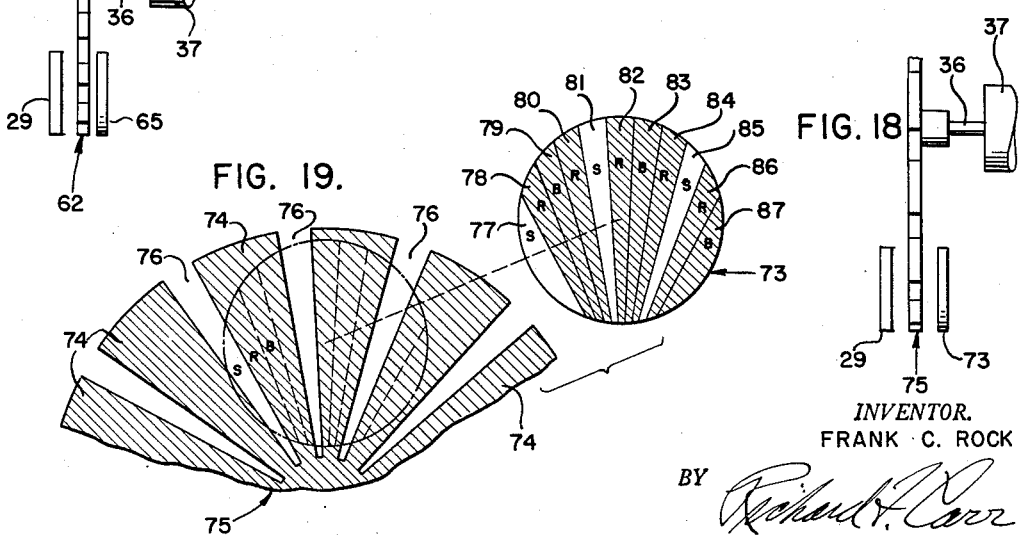

ical properties, particularly true in the agricultural field where walnuts, lemons, watermelons and many other items are graded by their color. The color determination is of extreme importance because of its influence on the amount the farmer receives for his crop as well as the ultimate price paid by the consumer. Sortings may be made in accordance with various shades of coloration. At the present time, most color grading rests upon the judgment of skilled technicians based on their observance of the products to be graded. Obviously there are many limitations to this kind of grading operation. It is inherently slow, cumbersome and expensive. Also, there are always differences of opinion, even among trained and experienced personnel. Fatigue leads to inconsistencies. Furthermore, it often is quite difficult to judge the precise color of an object because among a group of similar objects somewhat darker in shade it may appear pale by comparison, while the converse is true when it is associated with objects of a lighter color.

3,133,201
COLOR ANALYZING ARRANGEMENT
Frank C. Rock, 8459 Darby Ave., Northridge, Calif.
Filed Aug. 30, 1960, Ser. No. 52,925
13 Claims. (Cl. 250—226)

This invention pertains to a system which will provide a usable signal indicating the color of an object.

There are many commercial situations where objects must be sorted or graded in accordance with their colorimetric properties. This is particularly true in the agricultural field where walnuts, lemons, watermelons and many other items are graded by their color. The color determination is of extreme importance because of its influence on the amount the farmer receives for his crop as well as the ultimate price paid by the consumer. Sortings may be made in accordance with various shades of coloration. At the present time, most color grading rests upon the judgment of skilled technicians based on their observance of the products to be graded. Obviously there are many limitations to this kind of grading operation. It is inherently slow, cumbersome and expensive. Also, there are always differences of opinion, even among trained and experienced personnel. Fatigue leads to inconsistencies. Furthermore, it often is quite difficult to judge the precise color of an object because among a group of similar objects somewhat darker in shade it may appear pale by comparison, while the converse is true when it is associated with objects of a lighter color.

There have been in the past some proposals for automatic systems to remove color grading problems from the realm of manual inspection. However, these devices in general have been unsatisfactory. One problem has been that the signals generated in indicating the color of the object have been extremely weak. Hence, the sorting instruments have been subject to false readings from varying light conditions within the room where the sorting was taking place, and from almost any change in properties of the components of the system. Furthermore, these proposals have been unable to obtain an absolute color indication for objects heterogeneous in size. Local color differences on the surface of an object also have caused difficulty. As a result, automatic systems suggested in the past have not replaced the long used, yet always inaccurate, manual grading system.

The arrangement of this invention provides a fully automatic and reliable grading device in which light of a relatively high intensity is shone upon the object to be graded. The light reflected from the object is filtered alternately at different wave lengths, and the filtered light is received by a photoelectric cell to provide an electrical signal. In view of the difference in diffuse reflectance of an object at various wave lengths of light, the alternate filtering provides a direct indication of the color of the object. When the objects to be graded are of different sizes, three different wave lengths are used in obtaining a signal independent of size. Where the surface areas are uniform, only two different wave lengths are required.

Therefore, it is an object of this invention to provide an ararngement which will obtain a signal that indicates the colorimetric properties of an object.

Another object of this invention is to accurately color grade articles of varying sizes.

A further object of this invention is to color grade objects regardless of imperfections or variations in coloring on their exposed surfaces.

Yet another object of this invention is to obtain a relatively strong signal showing color indication by use of a relatively intense source of light.

An additional object of this invention is to provide a means for color grading objects such as walnut kernels where the pellicle may be broken and inner meat exposed.

A still further object of this invention is to obtain a signal indicating color by the use of reflected light filtered at different wave lengths.

An additional object of this invention is to filter light at rapidly changing wave lengths by use of a chopper rotating at moderate speeds.

Figure 4:
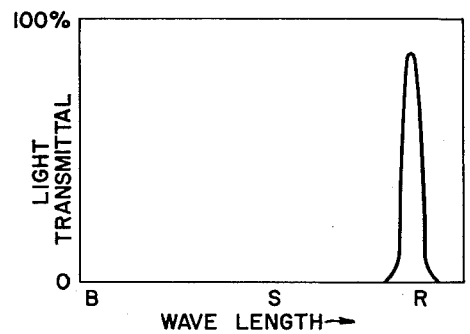
Figure 5:
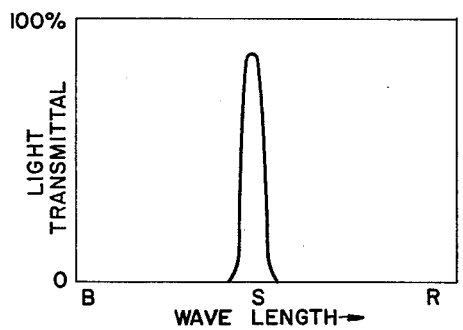
Figure 8:
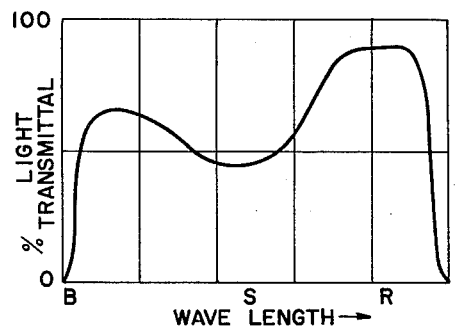
Figure 6:
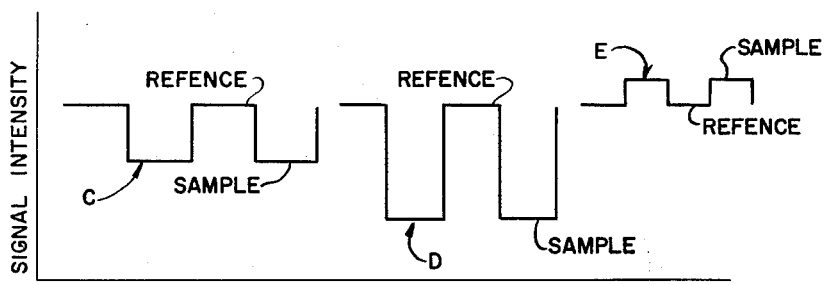
Figure 7:
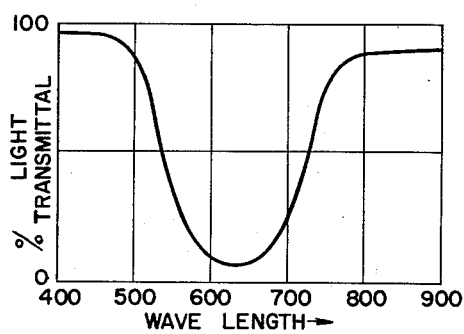
Figure 9:
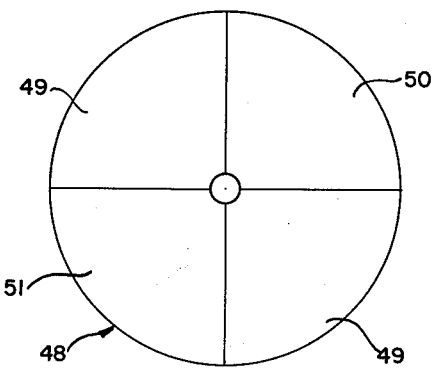
Figure 10:
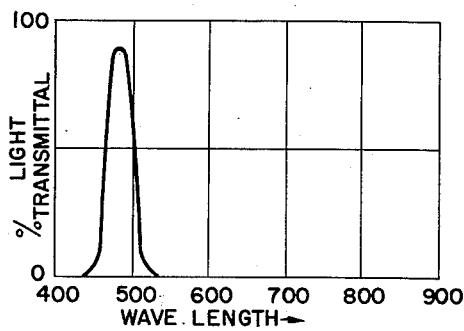
Figure 11:
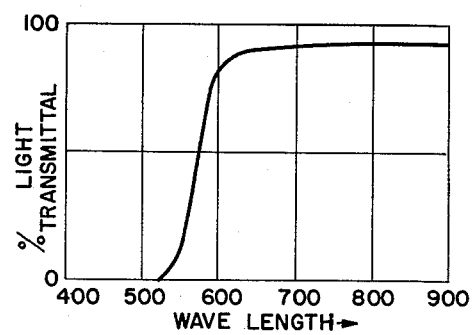
Figure 12:
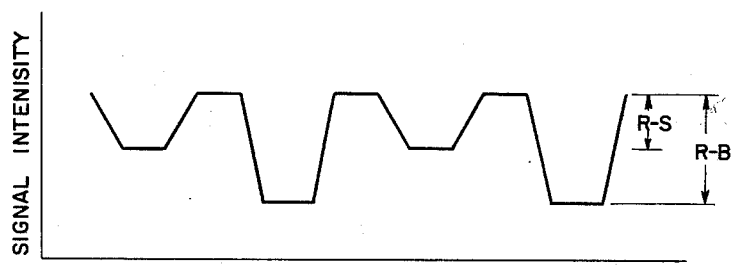
Figure 13:
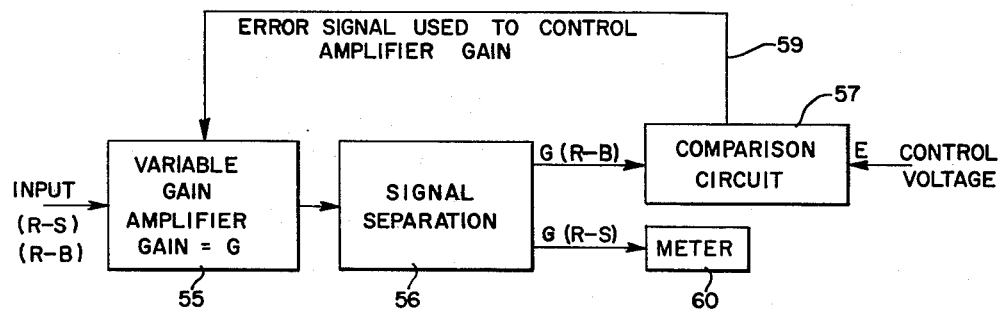
Figure 14:
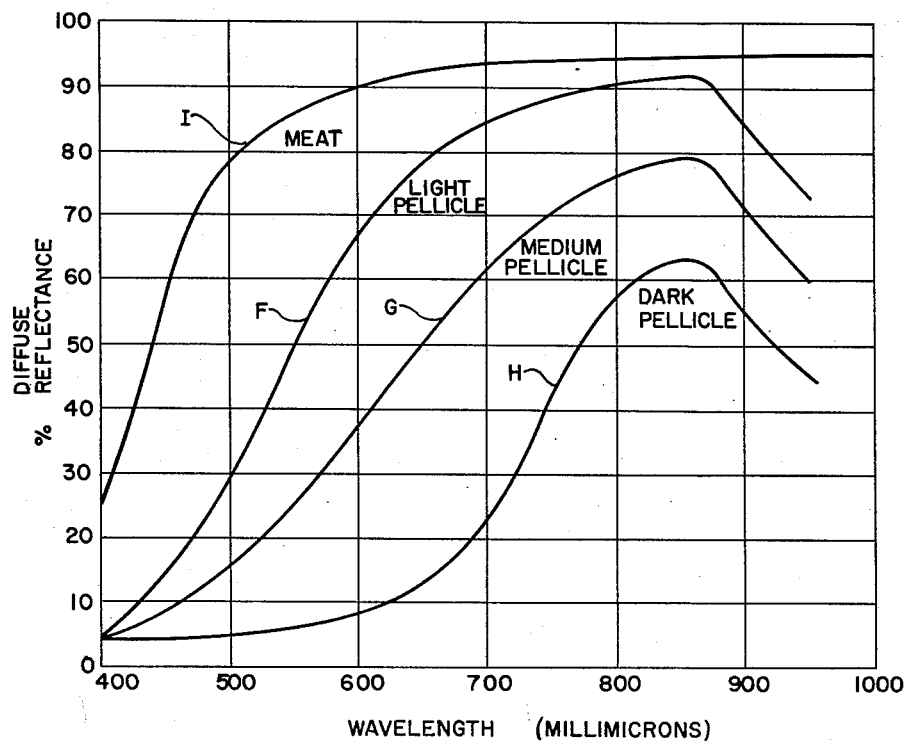

These and other objects will become apparent from the following detailed description taken in connection with the accompanying drawing in which:

FIG. 1 is a graph illustrating the spectral reflectance characteristics of an object to be graded in accordance with its colorimetric properties, FIG. 2 is a schematic illustration of a system for color grading objects in accordance with the teachings of this invention, FIG. 3 is a front elevational view of a rotatable filter wheel used in connection with the system of FIG. 1, FIG. 4 is a graph illustrating the characteristics of light transmission of one of the filters used in the filter wheel of FIG. 3, FIG. 5 is a graph similar to FIG. 4 showing the characteristics of the other filter of the filter wheel, FIG. 6 is a graph showing the electrical signals obtainable from a system of FIG. 2, FIG. 7 is a graph illustrating the light transmission characteristics of a pair of attenuating filters used with the system of FIG. 2, FIG. 8 is a graph of the properties of the system filter, FIG. 9 is a front elevational view of a filter wheel used in the arrangement of FIG. 2 where reflected light at three different wave lengths is to be obtained, FIG. 10 is a graph showing the light transmission characteristics of the filter used in the filter wheel of FIG. 8 for passing light at the lower wave length, FIG. 11 is a graph showing the light transmission of a second pair of attenuating filters used where the three-color system is employed, FIG. 12 is a graph illustrating the composite signal obtained from the three-color sampling system, FIG. 13 is a schematic illustration of a device for dividing the portion of the signal dependent upon both the color and surface area of the object, by the signal dependent only upon the area, FIG. 14 is a graph illustrating the diffuse reflectance of walnut kernels, FIG. 15 is a graph similar to FIG. 13 but with the axis of the curves shifted and correction made for the reflectance of the nut meat, FIG. 16 is a fragmentary plan view of a portion of the system of this invention where a chopper is utilized for obtaining rapid alternation in a two color system, FIG. 17 is an enlarged fragmentary elevational view of the chopper and filter assembly used with the arrangement of FIG. 16, FIG. 18 is a fragmentary view similar to FIG. 16 where the chopper for high frequency sampling is used in a three color system, and FIG. 19 is a fragmentary elevational view similar to FIG. 17, but illustrating the chopper and filter assembly used in the three-color system of FIG. 18.

This invention is based upon the principle that all colored objects absorb more light at some regions of the spectrum than they will at others. The amount of colorant present may be measured by determining the amount of reflected (i.e., unabsorbed) energy in various regions of the spectrum.

One kind of agricultural product, for example, may have a very high diffuse reflectance at longer wave lengths, while in the blue region the diffuse reflectance may be relatively small due to absorption by the skin pigment. This may hold true for both light and dark colored specimens of such a product. However, it may be found that dark skinned objects have considerably less reflectance in the mid spectral region than is the case for those having less pigment. To illustrate this graphically, curves X and Y in FIG. 1 may represent the reflectance characteristics for light and dark skinned agricultural products or other objects to be color graded. It may be observed that both such specimens exhibit a relatively high reflectance at longer wave lengths, while both absorb most of the energy in the blue region. Curve Y of the dark skinned article, however, drops off more sharply from its peak reflectance value as wave length is decreased. This is because of the greater colorant absorption of such objects in the central region of the spectrum.

By the provisions of this invention, reflected light from an object to be graded first is used to produce a signal at a wave length where objects of its class have substantially the same maximum reflectance. This light may be received by a photoelectric cell to provide an indication of the amount of reflected light at that wave length. Then the light reflected from this object again is filtered to pass light at a different wave length at some other point on the spectrum where a reduced amount of reflectance is obtained, and objects of different colors do not reflect equally.

In the example of FIG. 1, the light reflected from the object may be filtered initially to transmit energy to a photoelectric cell only at wave length R (which will be termed the reference wave length) where both light and dark skinned objects have a maximum reflectance. Next, the reflected light is filtered to pass light only at wave length S (referred to as the sample wave length) where there is a pronounced difference in reflectance depending upon the color of the object. Therefore, the difference in the amount of reflected energy obtained at these alternate wave lengths will be somewhat less for a light skinned object than it will be for one that is darker. This difference value is used to generate a usable signal that indicates the color of the object.

These results may be accomplished by the structure indicated in FIG. 2. According to this arrangement, a housing 2 is provided, the central portion of which includes a movable wire grid 3 adapted to support the object 4 which is to be graded according to its color. At the corners of housing 2 are lights 5, 6, 7 and 8 which are arranged to illuminate object 4 uniformly on both sides. The energy reflected from the two sides of object 4 leaves housing 2 through apertures 9 and 10, passing through objective lenses 11 and 12.

Only light which is reflected from object 4 should be so transmitted from the housing, and the object should be subjected to light of an even intensity. Therefore, the housing is constructed with internal walls and baffles arranged to diffuse and properly distribute the light from bulbs 5, 6, 7 and 8, while preventing unwanted reflections or direct illumination from striking lenses 11 and 12. To this end, wall surfaces 14 and 15 adjacent each lamp are provided with white matte paint or similar surface which will reflect the light from the light source in a uniform manner without glare. Also, inclined surfaces 16 are coated with such paint, as well as the inner surface of a baffle 17. Second baffle 18 and all other surfaces inside of the housing have a flat, black surface. Support grid 3 also is given a flat black finish so that it will not reflect light. In addition, baffle edges 20 are provided along the tubular entry ways formed by passages 9 and 10, in order to prevent stray radiation reflected from these surfaces from entering the optical system through lenses 11 and 12. Variations in this construction are possible, but the design shown is particularly effective in obtaining the desired type of lighting.

The light reflected from the object passes through objective lenses 11 and 12 and is reflected by mirrors 21, 22, 23 and 24 to a pair of field lenses 25 and 26. Additional mirrors 27 and 28 direct the light from the latter two lenses to a ground glass 29. Thus, there is integrated on ground glass 29 all of the light reflected from both sides of object 4. The image from ground glass 29 is focused by a condenser lens 33 upon a photosensitive device such as photoelectric cell 32.

Located immediately behind ground glass 29 is a filter wheel 35 carried by shaft 36, rotatable by motor 37. This filter wheel, seen in elevation in FIG. 3, may include two semicircular filters 38 and 39 which transmit relatively narrow bands of light at different wave lengths. Thus, filter 38 is a narrow band optical filter which transmits only the light of wave length R of FIG. 1 near the red portion of the spectrum. A typical curve for such a filter may be seen in FIG. 4. On the other hand, filter 39 transmits light only at the shorter wave length S of FIG. 1, having characteristics indicated in the curve of FIG. 5.

It is apparent, therefore, that upon rotation of filter wheel 35, the photoelectric cell alternately will receive light at wave lengths R and S. In view of the fact that all objects of the properties indicated in FIG. 1 have less reflectance at wave length S than at wave length R, the photoelectric cell 32 will generate an alternating signal. Thus, when light at the longer wave length, and hence the greater reflectance, strikes the photoelectric cell, the peak amplitude of the signal will be realized. At the shorter wave length and lower reflectance value, the nadir of the alternating signal will be produced.

The magnitude of the amplitude of the signal obtained in this manner is dependent upon the color of object 4 from which the light is reflected. In other words, if object 4 has a relatively light pigment and its reflectance at different wave lengths follows curve X of FIG. 1 there is relatively little differential between the amount of light reflected at the longer and shorter wave lengths. Therefore, the signal produced by the photoelectric cell, when alternately subjected to light reflected at the two frequencies, will have a small amplitude.

However, if object 4 is dark, and thus follows the characteristics of curve Y, there is a larger difference between the amount of reflectance at the longer wave length and that at the shorter. This means that the signal will have a sizable amplitude.

Therefore, by observing the amplitude of the signal from the photoelectric cell, the color of object 4 can be determined. This is illustrated graphically in FIG. 6 where curve C represents the alternating signal observable for lighter objects when the light is filtered at wave lengths R and S. When the light is obtained from dark objects the amplitude is greater as indicated by curve D. Of course it is apparent that for objects shaded between those represented by reflectance curves X and Y, intermediate signal amplitudes will occur.

An important feature of this invention is that any energy providing an achromatic reflectance from supporting members and imperfect light baffles, or scattered from dust on the optical elements, will not yield an electrical signal. This is because the response of the system to such energy at the longer, or reference, wave length is identical to that at the shorter sample wave. Consequently, the output of the photoelectric cell resulting from this reflectance is unvarying. This factor also eliminates the effect of specular reflectance from the object, which yields a surface glare not related to the skin color.

In order to obtain a practical system certain additional elements should be included to assure that a usable color indicating signal will be realized. It is found that the characteristics of the filters, sources of light, lenses and spectral response of the photoelectric cell are somewhat variable, and the electrical signal realized at each wave length cannot be set precisely in the manufacturing process. Also, the spectral distribution of the lamp may vary, and other factors may change the system's characteristics with time.

For example, the components of the system may have characteristics such that when light is reflected from an uncolored surface, a greater response actually will be obtained at the sample wave length than at the longer reference wave length. This would cause the signal from the photoelectric cell for such light objects to follow curve E (see FIG. 6) where the value of the signal at the sample wave length would be gerater than the signal at the reference wave length. Then, for progressively darker objects, the signal at the sample wave length would approach the signal at the reference wave length, yielding a composite signal which decreased rather than becoming greater in amplitude as represented by curve D. For extremely dark objects, the sample wave length signal might fall slightly below the reference signal. In other words, as objects became darker, the signal amplitude first would decrease and then increase. This would make the utilization and detection of color differences much more difficult.

Therefore, in addition to the desirability of having the system optically balanced so that no signal originates from uncolored objects, it is important that the signal has an increasing amplitude as the objects tested become darker.

Optical balancing may be obtained by the inclusion of a pair of absorption-type band rejection filters 45 and 46 adjacent filter wheel 35, a location where illumination is uniform and not a function of the shape or position of the object. Filters 45 and 46 may have the characteristics shown in FIG. 7 where it can be seen that much of the light at the sample wave length S is rejected by these filters, while at the reference wave length practically all light is transmitted. Therefore, if at the sample wave length too much light is transmitted to the photoelectric cell (for example, so as to give a positive signal above the reference value for an uncolored surface as shown in curve E of FIG. 6) filters 45 and 46 are converged into the beam to decrease the amount of light transmitted at the sample wave length. Such a position for these filters is indicated in phantom in FIG. 2. By appropriate translational movement, the system may be balanced so that the signal at the sample wave length will be equal to that at the reference wave length for a colorless object. The greater the translational movement of filters 45 and 46 to converge on the light beam passing from filter wheel 35 to photoelectric cell 32, the more light will be cut off at the sample wave length. Therefore, perfect optical balancing of the system may be obtained by a simple mechanical adjustment of the two absorption filters 45 and 46.

In general it is not desirable to operate the system with the balancing filters 45 and 46 converged too far into the beam. This is because their adjustment then becomes overly sensitive, as well as a tendency to make the reading somewhat dependent upon the position of the sample. Therefore, it may be desirable to utilize an additional optical balancing element in the light path in the form of a system filter 47. This filter may be partially absorbing in certain regions of the spectrum so that the movable balancing filters 45 and 46 are used only in obtaining final adjustment. In addition, the system filter 47 may be used to reject certain wave lengths where no energy is desired, such as in the ultraviolet or infrared region of the spectrum, rather than to complicate the design of filters 38 and 39 on the rotating wheel. The properties of filter 47 may be similar to those shown in FIG. 8 where this filter serves to partially balance the system as well as to perform its corrective functions.

It should be noted that a strang signal is obtainable from the photoelectric cell by the provisions of this invention. This is because a relatively intense source of illumination of the object may be used, the reflected energy collected by large aperture optics, and the desired wave length obtained by use of highly efficient narrow-band interference type filters. In addition, with the object illuminated uniformly on all sides, spots or other differences in color on the surface of the object will not cause variations of the overall reflectance for different positions of the object, and full reproducible results will be obtained.

While the arrangement described above operates quite satisfactorily for articles of uniform size, complications are encountered where the dimensions of the objects vary. The total light reflected by the object depends not only upon its color, but also upon its surface area. This means, for example, that a relatively dark object that is large will reflect as much as, if not more than, the light reflected from an object having less pigment in its surface but of smaller size. Observing the signal from the photoelectric cell, therefore, would not indicate the color of an object if its surface area had not been predetermined.

However, the system of this invention is adaptable to obtain an absolute color responsive signal, even when objects of random size are being tested. This involves transmitting light to the photoelectric cell at three different wave lengths instead of the two wave lengths as described above. The reasons for providing a three wave length system may best be understood by referring again to FIG. 1.

While practically all of the light incident upon the object is reflected at the reference wave length near the infrared portion of the spectrum, at some other wave length most of the light will be absorbed regardless of the color of the object. Thus, it may be seen that while curves X and Y converge at their upper ends near the reference wave length, they also come together toward the blue end of the spectrum. This means that for a wave length B, objects of both light and dark color will absorb practically all of the energy incident upon them, regardless of the pigmentation of the object. Therefore, the difference between the signals at the reference wave length and at the wave length B is dependent entirely upon the surface area of the object, because at both of these wave lengths color is of no consequence.

The signal previously obtained by alternating between the reference wave length and the sample wave length, as discussed above, results from both the area and the color of the object. In other words, this signal is proportionate to the product of the area of the object times the darkness of the object. The signal obtained by alternating between the reference wave length and wave length B, however, depends only upon the area of the object, regardless of its color. Therefore, if the first of the signals is divided by the second, the area factor is eliminated and the resulting signal depends only upon the color of the object tested.

In arriving at a color signal independent of size, the system basically is the same as before, but includes certain additions and the replacement of filter wheel 35 by a different filter wheel 48. As seen in FIG. 9, this involves use of two diametrically oposed filters 49 for transmitting light at the reference wave length, plus a single filter 50 interposed between the two filters 49 on one side for transmitting light at the sample wave length. An additional filter 51 also is interposed between filters 49 on the other side for transmitting only at the wave length B. The filters 49 and 50 may have the characteristics previously shown in FIGS. 4 and 5. Filter 51 may follow the curve illustrated in FIG. 10, passing light only in the region of the wave length B at the blue end of the spectrum.

In addition, another pair of attenuating filters 52 and 53 is included for balancing the system with respect to the signal from the lower wave length B. The latter filters transmit light in accordance with the curve of FIG. 11, absorbing the light near wave length B, but having no appreciable effect at wave lengths S and R. Therefore, as with filters 45 and 46, translational convergent movement of filters 52 and 53 will block off portions of the signal at wave length B, thereby permitting the system to be balanced optically.

With the filter wheel 48 in rotation, the system will produce a signal such as seen in FIG. 12. This is an alternating signal going from the reference signal to the sample signal, back to the reference signal, and then to the signal at wave length B where substantially all of the light is absorbed by the object. The resulting composite signal contains both the signal dependent upon area times darkness, and the signal proportional to area alone.

In most instances, in accordance with this invention, the system is arranged to reflect an intense light from the object, which then is filtered prior to incidence upon the photoelectric cell. This yields strong signals which are not influenced by system noise or varying ambient illumination. It is possible, however, to select the color regions initially, before incidence of the light on the object under observation. In other words, light alternating among the three chosen wave lengths can be shone on the object, and this reflected light sent directly to the photosensitive device. A similar composite signal will be obtained, although less intensity can be expected.

The two signals making up the composite signal of FIG. 12 may be divided by means of a number of appropriate systems in order to obtain a usable indication which depends only upon the color of the object tested. It is possible, of course, merely to connect the photoelectric cell to a meter, then observe the readings at the various wave lengths and divide one reading by the other. A self balancing potentiometer, after proper separation, also can be used to divide one signal by the other. These suggestions are more exemplary of the function of the dividing system rather than describing arrangements adapted for any extensive production type use.

An electronic circuit for accomplishing the division of the signals, generally similar to the automatic gain control of a radio, may be seen in FIG. 13. The composite signal first is fed into variable gain amplifier 55 after which the signal separation circuit 56 separates the amplified signals. The area-dependent signal resulting from the difference between the reflectance at the reference and blue wave lengths enters a comparison circuit 57 where a fixed control voltage also is applied. The error signal arising from the two input signals in the comparison circuit is fed back to amplifier 55 through lead 59, where it is used to control the gain of the amplifier. Thus, the reference-blue signal is made equal to the control voltage by the gain control loop. Therefore, the reference-sample wave length signal, by being amplified in the same circuit, becomes the quotient of the two input signals. The reading on meter 60, therefore, will indicate the reference-sample signal divided by the reference-blue signal. In other words, the signal proportionate to area times color is divided by the signal dependent only on area to give a meter reading showing the color of the object tested.

The techniques discussed above are usable in color grading practically any object for which such information is desired. The precise wave lengths selected for alternately transmitting energy to the photoelectric cell may vary depending upon the reflectance of the type of object being tested, but the same techniques will be utilized and the basic concepts will remain unchanged.

Among the objects most difficult to grade automatically are walnut kernels. Not only is there a wide variation in the colorimetric properties of walnut kernels, which has an important bearing upon the value of this product, but also there are additional complicating factors. For one thing, the surfaces often are not uniform in color on any one wanut kernel but may include spots or veins of darker coloring upon a lighter surface. The kernels also are irregular in contour which causes shadows to be cast when the kernels are illuminated. Furthermore, when walnuts are shelled and graded, many of the kernels are broken so as to expose varying amounts of the inner white meat of the nut. This white meat has a very high reflectance value independent of the pellicle color.

The reflectance characteristics of walnut kernels may be seen by reference to FIG. 14 where the nuts of light pellicle, medium pellicle and dark pellicle are represented by curves F, G and H. Curve I shows the reflectance of the inner meat of the nut for all skin colors. It may be observed from these curves that regardless of the surface pigment of the nut, the maximum diffuse reflectance is obtained at approximately 840 millimicrons wave length. The values differ, however, from over 90% reflectance for light skinned kernels to less than 65% maximum for nuts having a dark pellicle. Unlike curves X and Y of FIG. 1, therefore, reflectance curves F, G and H are vertically spaced apart. However, this does not interfere with the operation of the system of this invention, because the signal obtained depends upon the differences between the reference signal and the signals at the other two wave lengths, no matter what their absolute values. Only the difference in reflectance is important, and thus the amplitude of the A.C. signal obtained, so that it is unimportant that the peak reflectance is somewhat less for darker nuts than it is for the light skinned nuts.

As curve I indicates, the meat of the nut actually is not pure white and its reflectance value drops off sharply toward the short wave lengths in the blue portion of the spectrum. However, this characteristic need have no effect upon the system as it operates, because of the optical balancing provisions. Filters 45 and 46, and 52 and 53, or other filters that may be included, permit the optical system to be adjusted so that the energy transmitted by the white meat of the nut will be approximately the same at all three frequencies selected. In order to accomplish this, the energy transmitted at the lower wave length must be increased relative to that at the reference and sample wave lengths. When this is done, the reflectance from the nut meat that is detected by the photoelectric cell can be made the same for all wave lengths. Therefore, this reflectance cannot affect the signal from the photoelectric cell because it causes no differential in amplitude at any of the wave lengths utilized. Thus, with proper balancing techniques, objects such as walnuts may be graded automatically even though many are broken and inner meat is exposed.

Shadows cast by irregularities in the surfaces of the kernels do not influence the signal obtained. This is because they can reflect no light and therefore they cannot affect the diffuse reflectance from these objects. Also, local spots or dark areas cannot cause an unrealistically low color grading due to the complete and uniform illumination of the kernels on both sides in the arrangement of FIG. 2 or a similar design.

The selection of the proper wave length in the blue region, however, requires some care. There exists for all walnuts a certain amount of non-diffuse reflectance which is present even in the blue region where diffuse reflection decreases to a minimum. This non-diffuse reflectance is small and may be around 4% of the total reflectance, but it is variable and depends upon the shape of the particular kernel involved. The effect of this specular reflectance is particularly severe in the range of 400 to 450 millimicrons where, in order to balance the system (to compensate for the reflectance from exposed meat) it would be necessary to emphasize greatly the blue response. In other words, if the diffuse reflectance is in effect substantially increased in the short blue region, the non-diffuse reflectance also becomes much larger, no longer remaining near the small 4% of the total reflectance value. The substantially amplified achromatic reflectance then would become a significant source of error.

The practical solution to the selection of the blue range wavelength is simplified by redrawing the reflectance curves as seen in FIG. 15. Curves F′, G′ and H′ represent the diffuse reflectance of light, medium and dark colored kernels corrected for the reflectance of the white meat of the nut. This slightly alters the contour of each of these curves, and, of course, the vertical axis now represents the signal obtainable from the photoelectric cell. In addition, the axes of the curves have been shifted vertically so that their peak values at the reference wave lengths coincide. This is permissible because only differential signals are important, and their absolute values have no significance.

When this is done, it may be seen that the diffuse reflectance curves also cross at approximately 490 millimicrons wave length. In other words, regardless of the color of the nut, the same difference in signal will be observed for a given sized kernel between the reference and blue wave lengths of 840 millimicrons and 490 millimicrons, respectively. Skin color, therefore, does not influence the differential signal between these two wave lengths. If the photoelectric cell is subjected to energy reflected from a walnut kernel first at a wave length of 840 millimicrons and then at a wave length of 490 millimicrons, the same amplitude of resulting signal will be obtained regardless of the color of the nut and dependent only upon its size. Therefore, when 490 millimicrons is selected for the blue range wave length, the amplitude of the resulting alternating signal is independent of color and directly proportional to area.

It can be seen from this analysis, therefore, that no matter what object is being tested for its color properties, the area-sensitive signal should be obtained with certain fundamentals in mind. Two wave lengths should be chosen where the difference in diffuse reflectance is the same, or nearly so, regardless of the color of the object. It is only this difference signal that is used in giving an indication of color, seen by the electronic system, and not the absolute values of the energy at either wave length. Therefore, when these two wave lengths are properly chosen, the difference signal will depend only on area and will be independent of color.

In the case of walnuts, where the colors under observation are varying shades of yellow to brown, these two wave lengths fall in the near infrared and the blue regions of the spectrum. For other objects the necessary conditions may be satisfied by different wave lengths, such as the red and green regions, or perhaps both may fall in the infrared. In any event, the reference wave length is selected where absorption is a minimum, while the other wave length is chosen to yield a difference signal independent of color after the system has been balanced. Although not possible for English walnuts, preferably these two wave lengths are close to each other in order to minimize the effects of lamp aging or supply voltage fluctuation.

In any arrangement for the utilization of this invention the color measurement should be independent of the position of the sample in the illuminating beam. This is especially important in production operations where the object is moving through the light beam during the measurement. In order to assure reliable results, the optical system must be such that the location of the image or the photoelectric cell does not change as the sample moves.

Likewise, any interference filters, such as those on the rotatable wheel, should be so located that the angle with which the energy passes through the filter does not vary significantly with position of the object. This is because the wave length transmitted by an interference filter changes with the angle of the light with respect to it, and the light which can pass through the filter will decrease in wave length as the angle of incidence on the filter surface becomes more acute. In the system shown in FIG. 2, the optical elements 11, 12, 25, 26, 33 and the color wheel 35 (or wheel 48) are properly placed to minimize the change of signal with sample position.

Another difficulty encountered where there is high speed movement of an object is in obtaining an adequate number of readings from it during its brief time in the system. Frequently the objects will be traveling with rapidity, and as many as one hundred objects may pass through the system each second. Nevertheless, it is necessary to generate a signal having at least several complete waves in order that the signal can be used as a reliable and accurate means of determining color.

High speed rotation of a conventional chopper in the light beam, and increasing the number of filter sectors in the filter wheel are possibilities. However, rotational speeds reach their practical limit and other difficulties are encountered before a significant number of wave cycles can be produced.

This problem is solved by the arrangement shown in FIGS. 16 and 17. By this construction, a chopper disc 62 is mounted on shaft 36 and rotatable by motor 37. Chopper disc 62 includes a plurality of opaque sectors 63 and open or transparent sectors 64 alternately arranged around its circumference. In the example illustrated, each sector describes an arc of 7½°. The interference filter 65 is located immediately behind chopper 62 (indicated in phantom in FIG. 17) in the path of the light beam from ground glass 29. This filter assembly includes a plurality of filter segments 66, 67, 68, 69, 70, 71 and 72. While the filter assembly is circular in outline, the filter segments are complementary to the sectors 63 and 64 of the chopper wheel at the radial position of the filter assembly with respect to the chopper. Therefore, with the filter assembly 65 located immediately behind the chopper in the location of phantom line circle, first the filters 66, 68, 70 and 72 will be exposed to the light beam by transparent sectors 64 of the chopper. After rotation of the chopper disc through an arc of 7½°, the filters 67, 69 and 71 are adjacent the transparent portions of the chopper disc. The latter group then filters the light beam directed toward the photoelectric cell.

The first group of filters may be those to transmit light at the sample wave length, while the second group passes light at the reference wave length. Thus, as the chopper disc is rotated, the light emanating from the filter assembly alternates rapidly between these two wave lengths. Only moderate rotational speed of the chopper disc is necessary in order to obtain extremely high alternation in the light passing through the filter assembly. Rotation at 3600 r.p.m. will be satisfactory in most instances.

Where a three wave length system is utilized, the arrangement of FIGS. 18 and 19 may be resorted to, wherein the filter assembly 73 has filter segments alternating in order between the sample wave length, the reference wave length, the blue wave length and again the reference wave length. The size of the opaque portions 74 of the chopper disc 75 with respect to its transparent portions 76 is made such that when all of one kind of filter segments are exposed, the remaining filter segments will be blocked off. This relationship may be seen in FIG. 19 where the sample wave length filter segments 77, 81 and 85 are exposed through transparent sectors 76, while the remaining portions of the filter unit are covered by the opaque sectors 74 of the chopper disc. Upon very little additional clockwise rotation, the sample filters will be covered and the reference filter segments 78, 82 and 86 will be open to the beam of light. Successively, the group of blue wave length segments 79, 83 and 87, and the reference wave length sectors 80 and 84 will be uncovered by the transparent portions of the chopper disc.

Again, for only relatively slow chopper disc rotation, the light transmitted to the photo-electric cell will alternate with great rapidity among the three wave lengths selected.

It can be seen from the foregoing, therefore, that I have provided a photometric system for grading or testing objects in accordance with their color values which may operate independently of the surface areas of the object being tested. Matters such as surface irregularities, achromatic reflectance, localized dark or light areas, or breaks in the pellicle do not affect the results obtained. In addition, it is possible by the teachings of this invention to obtain a rapidly alternating A.C. signal for objects passing through the system at high speed in a mass production color sorting operation. The system of this invention can be optically balanced and can be corrected from time to time for variations in characteristics of the elements of the system, if this be necessary. Also, this system provides for an intense signal so that its utilization is much more practical and reliable than previous devices of this type. At the same time, the system is not complex in its construction or use, but can be manufactured and operated at a relatively low cost.

The foregoing detailed description is to be clearly understood as given by way of illustration and example only, the spirit and scope of this invention being limited solely by the appended claims.

I claim:

1. A device for determining the colorimetric properties of objects independently of their size comprising means for obtaining a first signal dependent upon the difference in energy reflected from an object at a first wave length and at a second wave length, means for obtaining a second signal dependent upon the difference in energy reflected from said object at said first wave length and at a third wave length, and means for dividing said first signal by said second signal.

2. A device for determining the colorimetric properties of an object independent of its size comprising a radiant energy-sensitive-signal indicating means; means for subjecting said radiant energy-sensitive-signal indicating means to radiant energy reflected from said object at a first relatively long wavelength, a second shorter wavelength, and a third wavelength; and means for dividing the resulting signal obtained between said first and second wavelengths by the signal obtained between said first and third wavelengths to obtain a signal dependent only on the color of said object.

3. A color determining arrangement comprising radiant energy sensitive means; means for illuminating an object to be tested, said radiant energy sensitive means being in radiant energy receiving relationship with such an object for receiving reflected energy therefrom; and means interposed between said object and said radiant energy sensitive means for filtering the energy transmitted to said radiant energy sensitive means, said filtering means including narrow band optical filter means for transmitting energy at relatively long, intermediate and short wave lengths, means for positioning said filters in the path of said reflected energy from said object so as to alternate between said filter at said relatively long wave length and said filter at said intermediate wave length, and between said filter at said relatively long wave and said filter at said relatively short wave length, said radiant energy sensitive means including means for indicating the amount of light received at said wave lengths.

4. A device as recited in claim 3 including, in addition, a filter for attenuating radiant energy at said intermediate wave length, and a filter for attenuating radiant energy at said relatively short wave length, said filters being variably positionable in the path of said reflected energy for controlling the amount of light transmitted at said intermediate and at said relatively short wave lengths.

5. A device as recited in claim 4 in which said last mentioned filters comprise a pair of filters for attenuating radiant energy at said intermediate wave length and a pair of filters for attenuating radiant energy at said relatively short wave length, each of said pairs including a filter disposed on either side of the path of said reflected energy, said filters being capable of rectilinear movement converging toward said beam or diverging away from the same for thereby providing said adjustment of the amount of energy obstructed thereby.

6. A device as recited in claim 3 in which said means for filtering the energy transmitted to said radiant energy sensitive means includes a rotatable wheel having a portion thereof in the path of said radiant energy between said means for illuminating an object and said radiant energy sensitive means, said wheel having a plurality of opaque sectors and a plurality of transparent sectors interposed between said opaque sectors, said narrow band optical filter means including an assembly of a plurality of first filters for transmitting energy at said relatively long wave length, a plurality of second filters for transmitting energy at said intermediate wave length, and a plurality of third filters for transmitting energy at said short wave length, said assembly being disposed adjacent said wheel and arranged with respect thereto such that at one rotational position only the first filters are exposed to said transparent sectors and the remaining filters are obstructed by said opaque sectors, at a second position upon continued rotation of said wheel only said second filters are exposed to said transparent sectors, at a third position upon continued rotation of said wheel only said first filters are exposed to said transparent sectors, and at a fourth position upon continued rotation of said wheel only said third filters are exposed to said transparent sectors, whereby said alternation takes place.

7. A device for color grading an object comprising means for supporting an object to be graded, means for uniformly illuminating said object, photo-electric cell means, means for transmitting light reflected from said object to said photoelectric cell, and filter means associated with said light transmitting means, said filter means including a first narrow band optical filter for transmitting light to said photoelectric cell means only at a first relatively long wave length, a second narrow band optical filter for transmitting light to said photoelectric cell means only at a second relatively short wave length, a third narrow band optical filter for transmitting light to said photoelectric cell means at an intermediate wave length, and means for changing said filters for filtering the light in said light transmitting means alternately at said relatively long and relatively short, and relatively long and intermediate wave lengths.

8. A device as recited in claim 7 in which said filter means comprises a disc having a duality of diametrically opposed sectors for said first filter, said second filter being an additional sector interposed between two adjacent edges of said sectors making up said first filter, and said third filter being a sector interposed between the other adjacent edges of said sectors making up said first filter, said disc being rotatable about its axis and positioned with said axis on one side of the path of light transmitted by said light transmitting means with said filters on said side extending into said path whereby rotation of said disc causes such alternate filtering of said light.

9. The method of grading walnuts comprising the steps of obtaining a first alternating electrical signal by light reflected from a walnut kernel alternately at approximately 840 millimicrons wave length and approximately 490 millimicrons wave length, obtaining a second additional alternating electrical signal by means of light reflected from said kernel alternately at approximately 840 millimicrons and approximately 640 millimicrons, and then dividing said second signal by said first signal.

10. A device for alternately filtering a beam of radiant energy to transmit energy selectively at different portions of the spectrum comprising a rotatable wheel a portion of which is in the path of said beam, said wheel having a plurality of opaque sectors radiating outwardly from the axis thereof and equally spaced about the circumference thereof, and a plurality of transparent sectors radiating outwardly from said axis and interposed between said opaque sectors; and a filter assembly in the path of said beam adjacent said wheel, said filter assembly including filters for transmitting energy at different portions of the spectrum, said filters having connecting edges complementary to the edges of said opaque sectors at one rotational position of said wheel, and positioned such that upon rotation of said wheel said filters are alternately exposed to said transparent sectors while the remaining filters are obstructed by said opaque sectors.

11. A device as recited in claim 10 in which said filter assembly includes filters for transmitting energy at a first, a second and a third portion of the spectrum, said filters being arranged alternately in the order of said first, said second, said first and said third filters, and dimensioned with respect to said sectors such that upon rotation of said wheel said filters are exposed to said transparent sectors in said order.

12. A color determining device comprising means for reflecting radiant energy from an object to be tested, radiant energy-sensitive means for receiving reflected energy from such an object, radiant energy-selective means for transmitting said reflected radiant energy to said radiant energy-sensitive means only at a first portion of the spectrum, and radiant energy-selective means for transmitting said reflected radiant energy to said radiant energy-sensitive means only at a second portion of the spectrum, said radiant energy selective means including a rotatable wheel having a portion thereof in the path of said reflected energy between said object and said radiant energy sensitive means, said wheel having a plurality of opaque sectors, and a plurality of transparent sectors interposed between said opaque sectors; and a filter assembly in said path adjacent said wheel, said filter assembly having a plurality of narrow band filters for transmitting energy at said first portion of the spectrum and a plurality of narrow band filters for transmitting energy at said second portion of the spectrum, said filters being arranged with respect to said wheel such that in one rotational position of said wheel, only said first mentioned narrow band filters are adjacent said transparent sectors and said second mentioned narrow band filters are adjacent said opaque sectors, and in another rotational position of said wheel only said second mentioned narrow band filters are adjacent said transparent sectors and said first mentioned narrow band filters are adjacent said opaque sectors.

13. A device for determining the colorimetric properties of an object independent of its size and in the presence of reflectances which are not indicative of said properties, said device comprising a radiant energy-sensitive-signal indicating means; means for subjecting said radiant-energy-sensitive-signal indicating means to radiant energy reflected from said object at a first relatively long wave length, a second shorter wave length, and a third wave length; optical balance means for subjecting said radiant energy-sensitive-signal indicating means to substantially equal amounts of radiant energy from said object at all of said wave lengths, whereby there is substantially no differential in the signal produced by said radiant energy-sensitive-signal indicating means from said reflectances at all of said wave lengths; and means for dividing the resulting signal obtained between said first and second wave lengths by the signal obtained between said first and third wave lengths to obtain a signal dependent only on the color of said object.

References Cited in the file of this patent

UNITED STATES PATENTS

| | | |
|---|---|---|
| 1,626,359 | Rundell | Apr. 26, 1927 |
| 1,898,219 | Sharp | Feb. 21, 1933 |
| 2,162,529 | Dawson et al. | June 13, 1939 |
| 2,244,826 | Cox | June 10, 1941 |
| 2,374,916 | Biedermann | May 1, 1945 |
| 2,474,230 | Cox | June 28, 1949 |
| 2,678,725 | Jacobson | May 18, 1954 |
| 2,856,811 | Kaye | Oct. 21, 1958 |
| 2,933,613 | Powers | Apr. 19, 1960 |
| 2,971,430 | Rohner et al. | Feb. 14, 1961 |